United States Patent [19]

Valeriano

[11] 3,908,799

[45] Sept. 30, 1975

[54] APPARATUS FOR DISPENSING A FLUID IN A CONDUIT INTERIOR

[76] Inventor: Anthony J. Valeriano, 669 Shuttle Meadow Ave., New Britain, Conn. 06052

[22] Filed: July 5, 1974

[21] Appl. No.: 486,158

[52] U.S. Cl............ 184/38 R; 74/503; 118/DIG. 10; 141/325; 184/1 E; 222/95; 254/134.3 FT
[51] Int. Cl.² ............................................. F16N 3/00
[58] Field of Search .... 184/38 R, 38 A, 38 B, 38 C, 184/15 R, 15 A, 15 B, 1 E, 6.19, 7 R, 8, 9, 184/10, 105 R, 105 A, 1 R, 14; 141/386, 383, 141/384, 114, 325; 254/134.3 FT; 138/108; 174/68 C; 29/424, 433

[56] References Cited
UNITED STATES PATENTS

| | | | |
|---|---|---|---|
| 2,001,983 | 5/1935 | Spiros | 222/96 |
| 2,129,627 | 9/1938 | Sands et al. | 222/95 X |
| 2,430,995 | 11/1947 | Roos | 222/107 |
| 2,717,661 | 9/1955 | Mayfield | 184/14 |
| 3,189,227 | 6/1965 | Hobbs et al. | 222/107 X |
| 3,211,573 | 10/1965 | Hight et al. | 117/95 |
| 3,224,732 | 12/1965 | Williams | 254/134.3 FT |
| 3,438,461 | 4/1969 | MacPherson | 184/1 R |
| 3,605,251 | 9/1971 | Salerno et al. | 138/108 X |

*Primary Examiner*—Richard C. Pinkham
*Assistant Examiner*—Arnold W. Kramer

[57] ABSTRACT

An apparatus and method for uniformly dispensing a fluid, such as a lubricant, in the interior of a conduit for easing the installation of wires or other conductors within the conduit employ a series of tubing sections filled with the fluid and a corresponding series of interconnected elongated rods. The tubing sections are attached by clamping loops to the interconnected rods so that a portion of the tube wall in each section is clamped closed. One end of the section includes a slit or other opening through which the fluid within the tubing section can be dispensed. The sections of tubing are inserted into a conduit by means of the interconnected rods, and the fluid is dispensed from the tubing sections into the conduit interior by pulling the tubing sections relative to the clamping loops in the rods and thereby progressively and continuously moving the clamped tube wall portion along each section toward the opening at the one end of the section to expel the fluid.

9 Claims, 6 Drawing Figures

3,908,799

APPARATUS FOR DISPENSING A FLUID IN A CONDUIT INTERIOR

BACKGROUND OF THE INVENTION

The present invention relates to a method and apparatus for dispensing a fluid in a conduit interior and, more particularly, is concerned with depositing a substantially uniform quantity of fluid, such as a lubricant, throughout the conduit interior so that the insertion of electrical or other conductors within the conduit can be executed with ease.

The most common prior art method of lubricating conduit interiors for the insertion of electrical conductors consists of applying a lubricant to an elongated flexible rod or wire called a snake and to the conductors themselves as they are pulled into one end of the conduit by the snake. The conductors rely upon the lubricant to reduce frictional forces between the conductors and the conduit interior and to thereby prevent damage to the conductors and conduit.

It is apparent that with lubricant being applied to the conductors at the entrance of the conduit, the points in the conduit more remote from the entrance receive far less lubricant than those stations adjacent the entrance. With exceptionally long runs of conduits, for example, 200 or 300 feet, frictional forces between the conduit walls and the conductors can become substantial due to the absence of lubricant at stations remote from the entrance.

To provide more uniform distribution of lubricant within conduit interiors, devices such as disclosed in U.S. Pat. Nos. 3,565,213, 3,605,251 and 3,605,947, have been mounted permanently at various stations along the conduit as it is assembled. When the conductors are subsequently installed, lubricant is released at the various stations where the devices are located and frictional forces are accordingly reduced. Such prior art devices become permanent fixtures in the conduit and must be installed before the conductors are inserted.

It is desirable that a means be provided for distributing a lubricant uniformly throughout the entire run of the conduit without having to prefabricate the conduit with devices solely concerned with depositing or dispensing a lubricant. It is accordingly a general object of the present invention to disclose an apparatus by which lubricants can be uniformly distributed within any open conduit without otherwise modifying or adding to the conduit structure.

SUMMARY OF THE INVENTION

The present invention resides in an apparatus of dispensing a fluid such as a lubricant in conduit interiors so that electrical or other conductors can be pulled through the conduit on the end of a snake with minimal friction forces.

The apparatus which is used to perform the present invention comprises an elongated rod having first and second ends and being sufficiently rigid to push the first end through the conduit in advance of the second end in substantially the same manner as the snake has been used in the past. Attached to the elongated rod is a section of tubing which has a flexible tube wall and a hollow tube interior between a first end of the section and a second end for storage of fluid.

The tubing section is attached to the elongated rod between the first and second ends of the section by clamping means located on the rod. The clamping means squeezes the flexible tube wall together adjacent the second end of the tube but permits the tubing section to be pulled through the clamping means to thereby progressively and continuously move the squeezed portion of the tubing section from the second end toward the first end. The first end is provided with an opening in the tube wall, and, therefore, as the squeezed portion of the tube wall moves toward the first end, a fluid stored within the tubing section is extruded from the section and is dispensed in the conduit interior.

By holding the elongated rod stationary within the conduit as the section of tubing is pulled through the clamping means, a substantially uniform quantity of fluid is dispensed along a length of the conduit equal to the length of the tubing section. A plurality of tubing sections and one or more associated rods may be interconnected in end-to-end fashion to cover an extended run of a conduit. The apparatus may be disposable or may be refilled with fluid for subsequent use.

DESCRIPTION OF THE PREFERRED EMBODIMENTS

Figure 1:
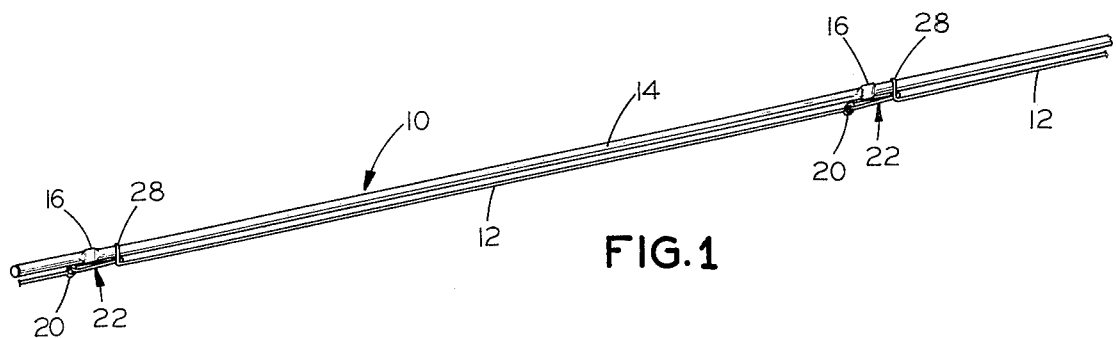
FIG. 1 is a perspective view of one embodiment of the apparatus of the present invention.

FIG. 1 illustrates a segment of the apparatus of the present invention generally designated 10. The apparatus may be employed to lubricate the interiors of conduits and the like prior to the installation of electrical conductors or cables and is also used to install the conductors themselves after the conduit interior has been lubricated. In addition to the lubricating and installing functions, the apparatus may be used in any environment where it is desirable to dispense a fluid or semi-fluid such as a grease, paste or putty in a confined space such as a conduit. Therefore, within the context of the present application, the term "fluid" is interpreted to include semi-fluids of the type mentioned.

Figure 2:
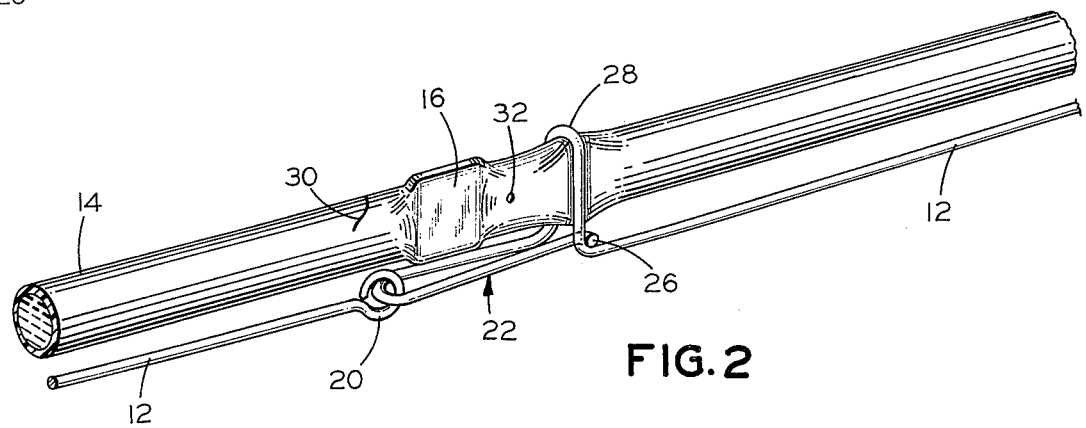
FIG. 2 is an enlarged perspective view of the apparatus at the junction of two sections of tubing and two elongated rods.
Figure 3:
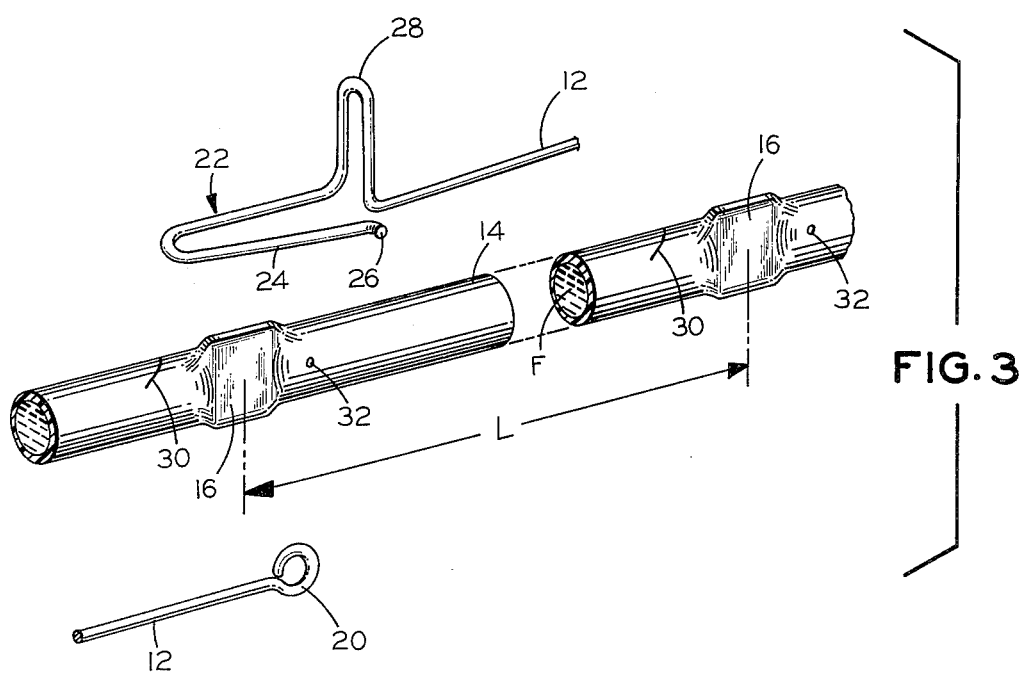
FIG. 3 is an enlarged exploded view of the apparatus with one section of tubing foreshortened.

The apparatus 10 shown in FIGS. 1, 2, and 3 is comprised principally of an elongated rod 12 and a section of tubing 14 which is filled with a fluid to be dispensed within a conduit. The tubing 14 is filled with a fluid F such as an electrically non-conductive grease or highly viscous liquid for lubricating the interiors of electrical conduits prior to the insertion of electrical conductors.

In a preferred embodiment of the invention, a series of elongated rods 12 are interconnected in end-to-end fashion as shown in FIGS. 1 and 2 and the tubing 14 is divided into a corresponding series of tubing sections having lengths L identified in FIG. 3 equal to the lengths of the rods 12. In the case where the tubing is a thermoplastic material divided into a series of sections connected in end-to-end fashion, the division between different sections of tubing is preferably defined by a heat seal 16 formed in the tube wall by pressing the tube walls together under heat and pressure. As a result, the hollow interior of the tubing is continuous only from one end of a section to the other and there is no communication between the interiors of adjacent sections.

The sectionalized construction of the apparatus 10 is not essential but is considered desirable since it facilitates the folding of the apparatus into a package of convenient size. The ends of the elongated rods 12 are linked together with pivoting joints that coincide with the heat seals 16 in the tubing 14 so that adjacent sections of tubing and the corresponding rods can be folded back upon themselves for storage. An exemplary length L for each section is approximately 15 inches or 38 centimeters.

FIGS. 2 and 3 illustrate in a greater detail the interconnections of the elongated rods 12. One end of a rod 12 has an eyelet 20 of generally circular configuration and the opposite end connectible with the eyelet of the next rod has an openable link 22. The link 22 includes a flexible leg 24 having a tang 26 at one end which latches the link closed at a U-shaped clamping loop 28 in the rod 12. The clamping loop is normally utilized to attach the tubing 14 to the rods 12 and to squeeze the tube wall together; however, it also forms a convenient point in the rod 12 to catch the tang 26.

When it is desired to disconnect the rods 12, the flexible leg 24 is flexed to disengage the tang 26 from the loop 28 and the link 22 is then disconnected from the eyelet. To re-assemble the rods 12, the flexible leg 24 is laced through the eyelet 20, and the tang 26 is again engaged with the loop 28. In FIG. 2 the link 22 is shown in the closed position engaging the eyelet, and in the exploded view in FIG. 3, the link 22 is shown in the open position. Such a link permits the apparatus 10 to be separated and reduced to a length suitable for insertion into a conduit of corresponding length without cutting a rod 12. The tubing 14 which is connected with the rods 12 is divided by cutting across a heat seal 16. If the heat seal is formed with a generally broad flattened area as illustrated, the tubing can be cut at the middle of the heat seal without breaking into the tube interior at either side of the seal 16.

In addition to the heat seal 16, each section of tubing 14 is provided at one end with a slit 30 forming an opening in one side of the tube wall through which the fluid F is dispensed or extruded into a conduit interior. A section of tubing may also be filled with the fluid through the slit 30. To relieve internal pressure during the filling process, a vent hole 32 may be provided in the opposite end of the section.

OPERATION

Figure 4:
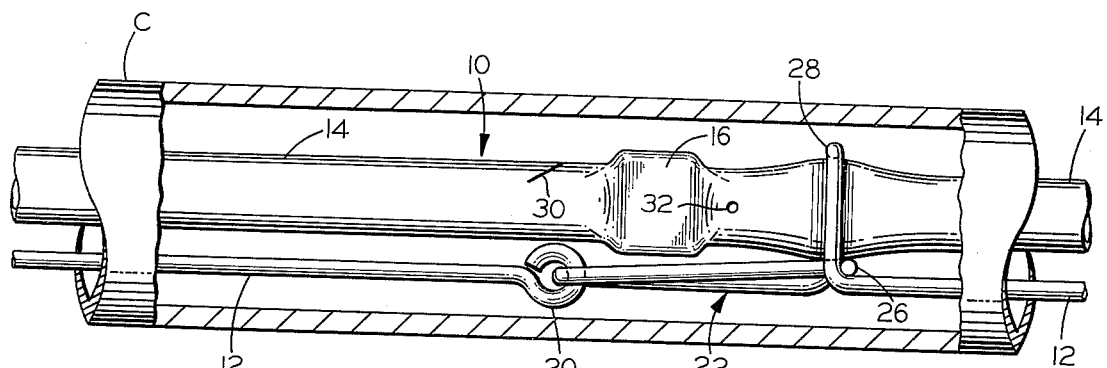
FIG. 4 is a view of the apparatus inserted in a conduit prior to dispensing a fluid.
Figure 5:
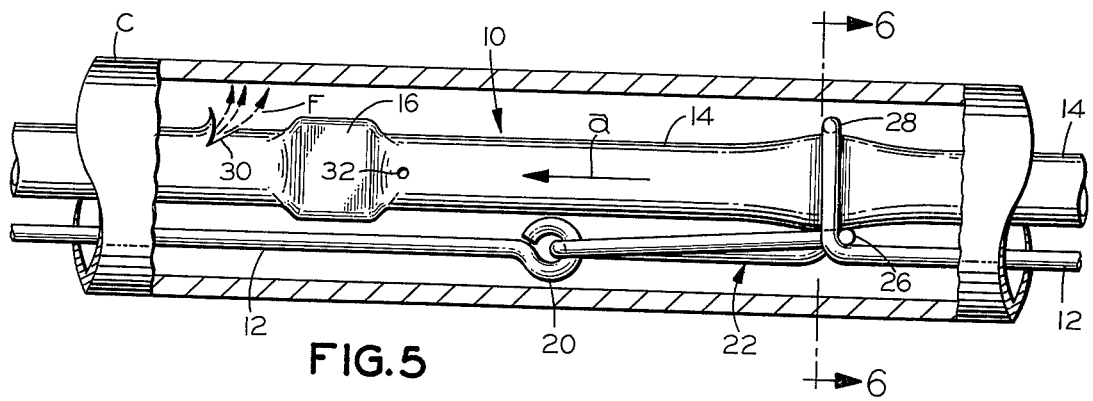
FIG. 5 is a view of the apparatus in the conduit during the dispensing of the fluid.
Figure 6:
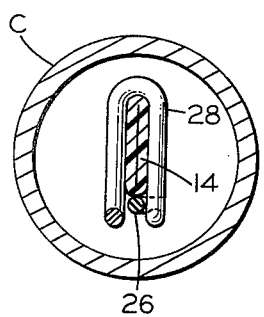
FIG. 6 is a sectional view of the apparatus as viewed along the sectioning line 6—6 in FIG. 5.

FIGS. 4, 5 and 6 illustrate the method by which a fluid is dispensed into the interior of a conduit C. Initially, the sections of tubing 14 are attached to the series of elongated rods 12 so that the heat seals lie adjacent the interconnected eyelet 20 and link 22 as shown in FIGS. 1 and 2. The clamping loops 28 attach the sections of tubing 14 to the rods 12 and clamp the flexible tube wall together at intervals corresponding to the length L of each tubing section. The vent hole 32 is located between a heat seal and the clamped portion of a tubing section so that filling of the interiors of the tubing sections should be accomplished prior to the attachment of the rods and tubing.

The assembled tubing and rods are inserted into the conduit C as shown in FIG. 4. The elongated rods 12 are constructed with a stiffness sufficient to be pushed into and through conduit C with the tubing 14 attached. The rods, however, are also provided with adequate flexibility to allow the apparatus 10 to be pushed through 90° bends in extended lengths of conduit. It will be understood that the length of the apparatus 10 inserted into the conduit must be coextensive with that portion of the conduit to receive the fluid F, and by virtue of the insertion process, at least one end of the apparatus will be exposed at one end of the conduit. Preferably, the apparatus is inserted through the full length of the conduit so that it is exposed at both ends and individuals using the apparatus are thereby assured that the entire length of the conduit will receive the fluid dispensed.

With the apparatus installed as shown in FIG. 4, the tubing 14 is then pulled relative to the rods 12 as indicated by the arrow *a* in FIG. 5 so that the heat seal 16 and vent hole 32 are pulled away from the adjacent clamping loop 28. By pulling the tubing 14 in this fashion, the flattened bulge in the tube wall formed by the clamping loop 28 as shown in FIG. 6 moves continuously and progressively along the section of tubing 14 and squeezes or extrudes stored fluid F out of the slit 30 at the opposite end of the tubing section.

If the series of rods 12 are held stationary within the conduit C as the tubing 14 is pulled, the slit 30 moves relative to the conduit wall and distributes a relatively uniform quantity of the extruded fluid along a length of the conduit equal to the length of a section of tubing or a portion thereof, depending upon how far the tubing is moved relative to the rods 12.

Since the sections of tubing 14 are interconnected, fluid F is extruded from each section and is deposited at stations along the entire length of the conduit C occupied by the apparatus 10. Accordingly, the conduit receives a uniform quantity of fluid throughout its length if the apparatus is inserted along the whole length of the conduit. The quantity of fluid deposited per unit length of conduit may be decreased by moving the rods 12 in the same direction as the arrow *a* in FIG. 5 as the tubing 14 is pulled relative to the rods; however, it is contemplated that in most instances the rods 12 will be held stationary in the conduit and the size of the slit 30 will be selected to deposit an appropriate quantity of the fluid F.

If the apparatus is used to lubricate a conduit for installing an electrical conductor or other item, the conductor to be inserted in the conduit is connected to one of the exposed ends of the series of rods 12 after the fluid F or lubricant has been deposited in the conduit interior. The rods 12 and tubing 14 are then removed from the conduit which pulls the conductors into the conduit. The lubricant dispensed from the tubing eases the task of pulling the conductors through the conduit and at the same time prevents the conductors from being damaged by virtue of excessive frictional forces between the conductors and conduit.

After the rods 12 and tubing 14 are withdrawn, the electrical conductors are disconnected from the rods, and the apparatus may be utilized again in another conduit. If the entire charge of fluid has been extruded from each section of the tubing 14, the tubing may be removed from each of the clamping loops 28 and may be loaded or recharged through the slit 30. Instead of removing the tubing from the clamping loops for recharging, the tubing may be pulled in the direction opposite the arrow *a* shown in FIG. 5 until the clamping loop 28 straddles the heat seal 16 and the vent hole 32 is not separated from a slit 30 by a clamping loop. While it is contemplated that the apparatus 10 may be used again and again, it is also possible to simply dispose of the apparatus as an expendable item after use.

Thus an apparatus and method have been disclosed for dispensing a uniform of quantity of fluid along a conduit interior. After the fluid has been dispensed, the apparatus serves the function of a snake in that electrical or other conductors can be pulled into the conduit by means of the rods 12.

While the present invention has been described in a preferred embodiment, it should be understood that various modifications and substitutions can be had without departing from the spirit of the invention. For example, although it is contemplated that the tubing 14 be pulled relative to the series of rods 12 by a distance substantially equal to the length of the tubing section, lesser amounts of fluid can be distributed at evenly spaced stations within a conduct by reducing the distance that the tubing is pulled. It is also contemplated that more than one clamping loop and tubing section may be associated with a single rod and that one continuous rod can be utilized for all of the tubing sections 14. The linked rods 12 are desired as described above for the purpose of storing the apparatus in a convenient package. Also, the flexible leg 24 of the link 22 tends to hold the tubing in the clamping loop 28 when the link is closed as shown in FIG. 6 and allows the tubing to be removed more easily when the link is open as in FIG. 3. Although the clamping loops 28 are shown as integral portions of the rods 12, other clamping means attached to the rod can be employed. The illustrated clamping loop 28 is desirable in that it operates conveniently with the flexible leg 24 of the link 22 as described. Accordingly, the present invention has been described in a preferred embodiment by way of illustration rather than limitation.

I claim:

1. Apparatus for dispensing a fluid in a conduit interior comprising:
    an elongated rod having first and second ends and being sufficiently rigid to push the first end through a conduit in advance of the second end;
    a section of tubing having a flexible tube wall and having a hollow tube interior between a first end of the section and a second end for storage of a fluid, the tubing section also having an opening in the tube wall adjacent the first end for dispensing stored fluid; and
    clamping means located on the elongated rod between the first and second ends for attaching the tubing section to the rod and for squeezing the flexible tube wall together adjacent the second end of the tubing section, the clamping means permitting the tubing section to move through the clamping means thereby forcing stored fluid in the tube interior out of the opening adjacent the first end of the tubing section.

2. Apparatus for dispensing a fluid in a conduit interior as defined in claim 1 wherein:
    the clamping means is integrally connected with the elongated rod.

3. Apparatus for dispensing a fluid in a conduit interior as in claim 2 wherein the clamping means comprises a U-shaped loop formed in the elongated rod.

4. Apparatus for dispensing a fluid in a conduit interior as defined in claim 1 wherein:
    the elongated rod and the section of tubing are substantially coextensive in length between their respective first and second ends; and
    the clamping means is located on the rod adjacent one of the rod ends.

5. Apparatus for dispensing a fluid in a conduit as in claim 1 further including:
    a series of said sections of tubing interconnected with one another in end-to-end relationship; and
    a plurality of said clamping means operatively associated with the series of tubing sections for forcing stored fluid from each of the sections.

6. Apparatus for dispensing a fluid in a conduit interior as in claim 5 wherein the series of said sections is formed from a thermoplastic tubing and each section of tubing at the first end has a heat seal in the tube wall.

7. Apparatus for dispensing a fluid in a conduit interior as in claim 5 further including:
    a series of said elongated rods interconnected with one another, each rod corresponding with one of the sections of tubing; and wherein
    the plurality of clamping means are located respectively on the series of interconnected elongated rods.

8. Apparatus for dispensing a fluid in a conduit interior as defined in claim 7 wherein each of the sections of tubing in the series contains a vent in the tube wall adjacent the second end.

9. Apparatus for dispensing a fluid in a conduit interior as defined in claim 7 wherein:
    each of the elongated rods of the series has an openable link at one end and an eyelet at the opposite end for connecting and disconnecting the rods in the series.

* * * * *